(No Model.)
E. S. SPAULDING.
METHOD OF TRANSMITTING AND RECEIVING ARTICULATE SOUNDS TO DISTANT POINTS.
No. 345,084. Patented July 6, 1886.
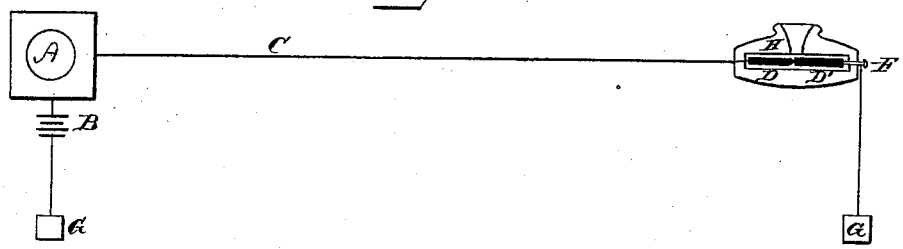
Fig. 1.
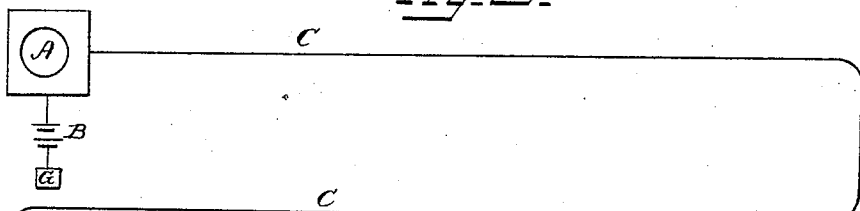
Fig. 2.
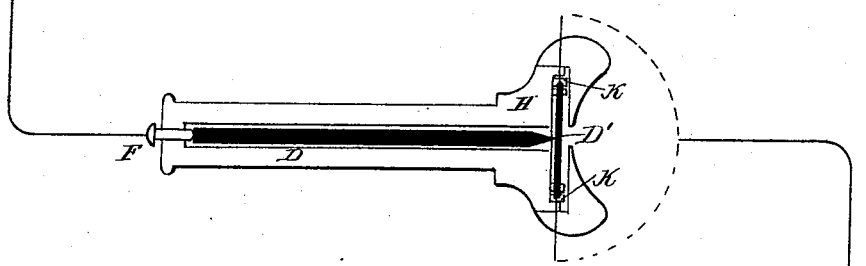
Fig. 3.
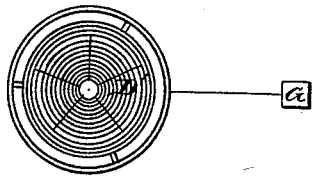
WITNESSES
J. L. Ourand
W. R. Rogers
Edward S. Spaulding
INVENTOR
H. J. Ennis
Attorney

UNITED STATES PATENT OFFICE.

EDWARD S. SPAULDING, OF NEW YORK, N. Y.

METHOD OF TRANSMITTING AND RECEIVING ARTICULATE SOUNDS TO DISTANT POINTS.

SPECIFICATION forming part of Letters Patent No. 345,084, dated July 6, 1886.

Application filed March 2, 1885. Serial No. 157,562. (No model.)

*To all whom it may concern:*

Be it known that I, EDWARD S. SPAULDING, a citizen of the United States, residing in the city, county, and State of New York, have invented a new and useful Method for Transmitting and Receiving Articulate Sounds, called "Krotophone," of which the following is a specification.

My invention has relation to a method of reproducing articulate sounds; and the novelty consists in the method of reproducing the human voice through the medium of crepitations or minute crackling sounds or detonations; and it particularly consists in causing the original disturbances in the transmitter to be transmitted over the line, so as to affect the receiver and cause it to give forth a series of crepitations or intermitting detonating sounds which will have the same articulate value as the original sounds, whereby the human voice when transmitted electrically from one point to another without the use of magnets, diaphragms, helices, secondary currents or induction-coils, or any vibrating or sonorous material whatever in the circuit, thus dispensing with the complicated parts, and the various objections to which transmitters and receivers are liable and subject; and the novelty consists in the method of transmitting and receiving articulate sounds, substantially as herein set forth.

In the accompanying drawings the same letters of reference indicate the same parts of my invention.

Figure 1 is a plan of the apparatus employed to carry out my method of transmitting sound. Fig. 2 is a similar view showing a modification of the form of a receiver; and Fig. 3 represents the circumferential connection of one of the carbon contact-points.

A is an ordinary transmitter; B, the battery; C, the line, and G G the grounds.

H illustrates the simplest form of my receiver or krotophone, in which D D' are the carbon points, which form part of the circuit or line C, one of the points, D, being rigidly secured in the receiver H, and the other point, D', being secured therein adjustably with reference to the other point by means of the screw F. The receiver H, containing the carbon-pencil points D D' and adjusting-screw F, constitute the complete receiver.

The transmitter A may be any one of the various forms of "microphones;" or, in fact, any instrument may be used in which the sound or voice produces a series of crepitations in the circuit which, being transmitted over the line, are reproduced in their identical quality between the carbon points in the receiver, which reproduction will have the same relation to the original sound as the original sound or voice had to the crepitations in the first instance.

In accordance with the letter and spirit of the patent laws, I will endeavor to give as correct an explanation of the operation of my invention as I am able, based upon the results of actual experiments and observations, without, however, in any way asserting their infallibility or wishing to provoke discussion as to the correctness of the deductions. For the sake of illustration we will assume that the circuit consists of a battery, line, and the receiver shown in Fig. 1 be used as a transmitter, and a similar instrument be used as a receiver proper. Assuming that the current passes through the carbon pencils in parallel lines, any disturbance of the point of contact of these pencils in the transmitter will produce a series of crepitations, which cause a series of corresponding electrical impulses to be transmitted over the circuit. Referring to the receiver, this circuit, passing in parallel lines through the pencil D, causes its points of contact with the opposite pencil, D', to vary by reason of the elongation and contraction of said pencil D, due, for want of a better term, to the polarization of the molecules or atoms of the pencil. Now, assuming that through the pencil the current passes in a series of many parallel lines, then the movement of the atoms in each of these lines would be uniformly similar and in parallel lines, and thus a disturbance created in the receiver corresponding to the impulses affecting it, which impulses in turn correspond with and depend on the primal disturbances in the transmitter. Now, then, it being shown that the polarization or disturbance of the atoms in the pencil D in the receiver is produced, I have noted that this result is accompanied by a series of crepitations or crackling sounds, which are clearly distinguishable from even the faintest sounds when produced by vibrations or other cause, and from this distinction I infer that the said crepitations are strictly "neutral," and so denominate them. Therefore, as such crepitations are individually neutral when they are arranged in constantly-varying groups, corresponding exactly to the primal disturbances which cause them, and thus if articulate sounds be the primal cause of the disturbance in the transmitter, articulate sounds will be the effect in the receiver.

I have found that when two pencils of carbon are used as the receiver, the sounds will be audible and distinct, but faint; and to overcome this objection, I have replaced one of the pencils by a plate of carbon of such size and quality as to be non-sonorous and non-vibrating, as shown in Fig. 2. This plate I provide with a circumferential ring, K, and said plate D' has a suitable elastic packing-ring, to prevent fracture when rigidly secured in place in holder H. In this form of receiver the current passing as before in parallel lines through the pencil D, and thence to the plate D' from the point of contact of the pencil, the current then radially diverges in every direction toward the metallic ring, and thence to the ground, as before. This construction gives an amplified sound, and this effect I attribute to the radial or diverging paths the current takes. In the first form of receiver described the current passes in parallel lines, and the movement of the atoms on each of these lines is uniform, and consequently the crepitations are faint; but in the second instance these several lines are not parallel, but divergent, and hence increased crepitating effect is produced.

I do not claim a transmitter, as my whole invention consists in the method of reproducing the voice through the medium of the receiving device, and from this it is clear that any form of carbon transmitter may be used in connection with my receiver.

So far as I am aware of the efforts of prior inventors, they have employed some means substantially different from mine—for example, the well-known experiments of Professor Hughes. The microphone requires a free pencil, and the effect seems to depend on the vibratory effort of the voice or other disturbing cause on the said pencil, causing it to move bodily and vary the amount or number of contact-points, while those of Berliner show and claim a diaphragm, and Cook employs a vibrating metallic diaphragm, all of which I distinctly disclaim.

In this application I do not claim the means for producing this result, as that is the subject-matter of another application, Serial No. 183,375, filed November 20, 1885, which is a division of the present case.

Having thus fully described my invention, what I claim as new and useful, and desire to secure by Letters Patent of the United States, is—

The method herein described of transmitting sounds electrically, which consists in conducting an electrical current to a given point and then dispersing said current radially, so as to produce and amplify the crepitations, substantially as herein described.

EDWARD S. SPAULDING.

Witnesses:
STEPHEN M. CHESTER,
FRED. G. SWASEY.